US012197999B2

(12) United States Patent
Nagahama

(10) Patent No.: US 12,197,999 B2
(45) Date of Patent: Jan. 14, 2025

(54) DYNAMIC TWO-DIMENSIONAL CODE EVALUATION METHOD, DYNAMIC TWO-DIMENSIONAL CODE EVALUATION SYSTEM, AND DYNAMIC TWO-DIMENSIONAL CODE EVALUATION PROGRAM

(71) Applicant: ARK LIMITED, Tokyo (JP)

(72) Inventor: Takeshi Nagahama, Tokyo (JP)

(73) Assignee: ARK LIMITED, Tokyo (JP)

( * ) Notice: Subject to any disclaimer, the term of this patent is extended or adjusted under 35 U.S.C. 154(b) by 520 days.

(21) Appl. No.: 17/430,585

(22) PCT Filed: Feb. 10, 2020

(86) PCT No.: PCT/JP2020/005090
§ 371 (c)(1),
(2) Date: Aug. 12, 2021

(87) PCT Pub. No.: WO2020/166549
PCT Pub. Date: Aug. 20, 2020

(65) Prior Publication Data
US 2022/0129653 A1 Apr. 28, 2022

(30) Foreign Application Priority Data
Feb. 15, 2019 (JP) ................................ 2019-026107

(51) Int. Cl.
*G06T 7/70* (2017.01)
*G06K 7/14* (2006.01)

(52) U.S. Cl.
CPC ......... *G06K 7/1417* (2013.01); *G06K 7/1465* (2013.01); *G06T 7/70* (2017.01)

(58) Field of Classification Search
None
See application file for complete search history.

(56) References Cited

U.S. PATENT DOCUMENTS

2012/0241525 A1* 9/2012 Borges ............. G06K 19/06112
235/494
2012/0314954 A1* 12/2012 Moore ............... H04N 1/32144
235/375

(Continued)

FOREIGN PATENT DOCUMENTS

JP 2002260099 A 9/2002
JP 2007265354 A 10/2007

(Continued)

OTHER PUBLICATIONS

Extended European Search Report (EESR) dated Dec. 21, 2022, issued in counterpart European Application No. 20755927.9.

(Continued)

*Primary Examiner* — Edward Park
(74) *Attorney, Agent, or Firm* — Holtz, Holtz & Volek PC

(57) ABSTRACT

A receiving unit receives configuration information for analyzing a set of a plurality of dynamically-displayed two-dimensional codes and evaluation information for evaluating the result of analysis, a photographing unit photographs a dynamically-displayed two-dimensional code, an analysis unit analyzes the photographed two-dimensional code based on the configuration information, and an evaluation unit evaluates the result of analysis in the analysis unit based on the evaluation information.

10 Claims, 8 Drawing Sheets

(56) References Cited

U.S. PATENT DOCUMENTS

| | | | |
|---|---|---|---|
| 2015/0136846 A1* | 5/2015 | Burkhart | G06K 19/06112 |
| | | | 235/494 |
| 2015/0269466 A1 | 9/2015 | Inotay et al. | |
| 2016/0267370 A1* | 9/2016 | Nishizaki | G06K 7/1434 |
| 2016/0292486 A1* | 10/2016 | Prusik | G06K 19/06046 |
| 2017/0124442 A1* | 5/2017 | Nishizaki | H03M 13/1515 |
| 2017/0235989 A1* | 8/2017 | Nishizaki | G09C 5/00 |
| | | | 235/462.1 |
| 2017/0316296 A1* | 11/2017 | Ashiura | G06K 19/06028 |
| 2019/0259354 A1* | 8/2019 | Liu | G06K 7/1417 |
| 2020/0065537 A1* | 2/2020 | He | G06K 7/10722 |
| 2023/0394561 A1* | 12/2023 | Gurgul | G06Q 30/0643 |

FOREIGN PATENT DOCUMENTS

| | | |
|---|---|---|
| JP | 2012181645 A | 9/2012 |
| JP | 2014049063 A | 3/2014 |
| JP | 2016024576 A | 2/2016 |
| JP | 2016085615 A | 5/2016 |

OTHER PUBLICATIONS

International Search Report (ISR) (and English language translation thereof) dated May 19, 2020 issued in International Application No. PCT/JP2020/005090.

Written Opinion dated May 19, 2020 issued in International Application No. PCT/JP2020/005090.

Japanese Office Action (and English language translation thereof) dated Nov. 9, 2021, issued in counterpart Japanese Application No. 2020-533320.

Chinese Office Action (and an English language translation thereof) dated Jan. 24, 2024, issued in counterpart Chinese Application No. 202080012768.4.

\* cited by examiner

FIG. 6

CONFIGURATION INFORMATION MANAGEMENT TABLE 1a

CONFIGURATION INFORMATION TABLE

CONFIGURATION INFORMATION ID 0001
CONFIGURATION INFORMATION ID A02, A04, A05, A06, B01, D01, D02, ...
SET INFORMATION
NUMBER : N
STARTING POINT: YES
DISPLAY TIME: * SEC/PER
REPETITION: YES
DISPLAY REGION: XXX~XXX, YYY~YYY
⋮
CONFIGURATION INFORMATION ID 0002
⋮

DISPLAY INFORMATION TABLE

DISPLAY INFORMATION ID
A01 INCLINATION (1 DEGREE TO 360 DEGREES)
A02 DIRECTION (UP/DOWN/LEFT/RIGHT)
A03 FRONT AND BACK (FRONT/BACK)
A04 LOCATION OF DISPLAY (COORDINATES XY)
A05 ORDER OF DISPLAY (N-TH)
A06 CODE COLOR (#NNNNNN)
⋮

STANDARD MASK PATTERN TABLE

STANDARD MASK PATTERN ID
B01 PATTERN 0
B02 PATTERN 1
⋮
B07 PATTERN 6
B08 PATTERN 7

ERROR CORRECTION WORD INFORMATION TABLE 1b

ERROR CORRECTION WORD INFORMATION ID
C01 BEFORE ERROR CORRECTION PROCESS
C02 AFTER ERROR CORRECTION PROCESS

DISPLAY TEXT TABLE

DISPLAY INFORMATION ID
D01 RIGHT!!
D02 WRONG
⋮

FIG. 7

EVALUATION INFORMATION MANAGEMENT TABLE

| EVALUATION INFORMATION ID 0001 |
|---|
| A02 DIRECTION (RIGHT)<br>A04 LOCATION OF DISPLAY<br>(COORDINATES XXX, YYY)<br>A05 3RD<br>A06 CODE COLOR (#000000)<br>B01 PATTERN 0<br>D01 RIGHT!!<br>- - - - - - - - - - - - - - - -<br>D02 WRONG |
| EVALUATION INFORMATION ID 0002 |
| ⋮ |

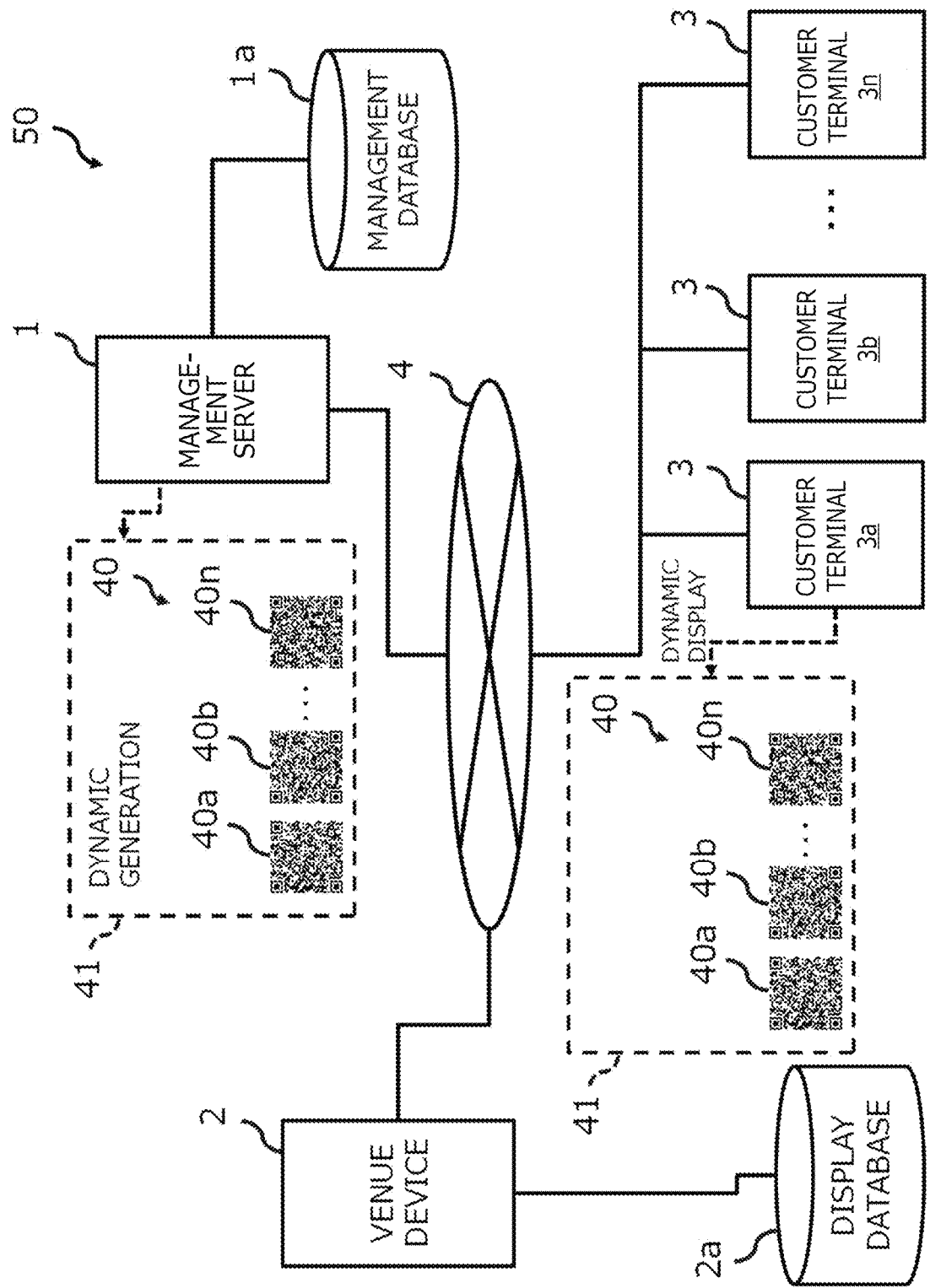

DYNAMIC TWO-DIMENSIONAL CODE EVALUATION METHOD, DYNAMIC TWO-DIMENSIONAL CODE EVALUATION SYSTEM, AND DYNAMIC TWO-DIMENSIONAL CODE EVALUATION PROGRAM

TECHNICAL FIELD

The present invention relates to a dynamic two-dimensional code evaluation method, a dynamic two-dimensional code evaluation system, and a dynamic two-dimensional code evaluation program.

BACKGROUND ART

A one-dimensional code is a code symbol, in which bands of light and dark that are arranged vary along a linear axis in a certain direction, and is generally known as "barcode". A two-dimensional code is a two-dimensional code symbol, in which points (dots) of light and dark or unit regions (modules) that are arranged vary on a plane defined by a vertical X-axis and a horizontal and Y-axis, and, for example, there are a variety of code symbols such as QR code (registered trademark), DataMatrix (registered trademark), PDF 417, and so forth.

For example, systems that are known to use two-dimensional codes include a system, in which a plurality of two-dimensional codes are displayed on the same screen, and in which user authentication is performed in the order in which the displayed two-dimensional codes are read (see, for example, patent literature 1), or a device that makes the code symbol format of a two-dimensional code three-dimensional, to prepare a three-dimensional code and increase the amount of information to store, thereby enhancing the security performance over a two-dimensional code (see, for example, patent literature 2).

CITATION LIST

Patent Literature

Patent Literature 1: Japanese Unexamined Patent Application Publication No. 2012-181645
Patent Literature 2: Japanese Unexamined Patent Application Publication No. 2014-49063

SUMMARY OF INVENTION

Problem to be Solved by the Invention

In the system disclosed in patent literature 1, when n×m two-dimensional codes are displayed, the user operates a reading device and reads each of the correct m two-dimensional codes, in which a predetermined number (m) of read data are connected, in the same order as the arrangement and locations as stored in a storage means, thereby enabling user authentication in an authentication means of an authentication server.

However, when a plurality of two-dimensional codes are displayed on the same screen, a general reading device will automatically read the two-dimensional codes that are inside the reading range. Therefore, if there is a distance between the reading device and a two-dimensional code, or if the display area of the display device is small, the reading device might read the wrong two-dimensional code, and fail successful authentication. In addition, since fixed images can be copied easily, there is a high risk of falsification or forgery.

The device disclosed in patent literature 2 reads information of a three-dimensional code by acquiring image data of the three-dimensional code, which is comprised of code parts of varying heights, by photographing the three-dimensional code a plurality of times, by changing the imaging plane in the height direction of the code parts, and by synthesizing the acquired image data.

However, the code needs to be formed three-dimensionally for three-dimensionalization, and therefore is not suitable for general electronic displays, in which two-dimensional codes, already wide-spread, are used, and unsuitability for mass production in consideration of marketability or distribution in the form of electronic data pose problems when put in service. In addition, since a three-dimensional code itself is a fixed object and can be duplicated, there is a risk of falsification or forgery.

The present invention has been made in view of the above problems, and it is therefore an object of the present invention to provide a dynamic two-dimensional code evaluation method, a dynamic two-dimensional code evaluation system, and a dynamic two-dimensional code evaluation program to use a plurality of two-dimensional codes that change dynamically and that are displayed in a series.

Means for Solving the Problem

The two-dimensional code evaluation method according to a first invention includes a receiving step of receiving configuration information for analyzing a set of a plurality of dynamically-displayed two-dimensional codes and evaluation information for evaluating a result of analysis, a photographing step of photographing a dynamically-displayed two-dimensional code, an analysis step of analyzing the photographed two-dimensional code based on the configuration information, and an evaluation step of evaluating the result of analysis in the analysis step based on the evaluation information.

Based on the first invention, in the two-dimensional code evaluation method according to a second invention, the configuration information includes at least one of an inclination, a direction, front and back, which are inverted mirror images of a code symbol, a location of display, an order of display, an inverted image of light and dark of an image, colors of light and dark constituting a code, a type of a two-dimensional code, and format information of the two-dimensional code, related to display of the two-dimensional code, and the evaluation information includes at least one of an inclination, a direction, front and back, which are inverted mirror images of a code symbol, a location of display, an order of display, an inverted image of light and dark of an image, colors of light and dark constituting a code, a type of a two-dimensional code, and format information of the two-dimensional code, related to display of a two-dimensional code that is specified in advance as being subject to evaluation.

Based on the first invention or the second invention, in the two-dimensional code evaluation method according to a third invention, the configuration information includes an identification number related to a standard mask pattern of the two-dimensional code, and the evaluation information includes an identification number of a standard mask pattern that is specified in advance as being subject to evaluation.

Based on any one of the first invention to the third invention, in the two-dimensional code evaluation method according to a fourth invention, the configuration information includes an error correction word included in the two-dimensional code, and the evaluation information includes an error correction word that is specified in advance as being subject to evaluation.

Based on any one of the first invention to the fourth invention, in the two-dimensional code evaluation method according to a fifth invention, the configuration information includes a codeword at a specific location, among data block constituent codewords consisting of a data codeword and a correction data codeword constituting the two-dimensional code, and the evaluation information includes a codeword at a specific location, among data block constituent codewords consisting of a data codeword and a correction data codeword constituting the two-dimensional code that is specified in advance as being subject to evaluation.

Based on any one of the first invention to the fifth invention, in the two-dimensional code evaluation method according to a sixth invention, the configuration information includes at least one constituent structure among public/private, structured append, read protection, and authentication structure, related to the constituent structure of a particular codeword of the two-dimensional code, and the evaluation information includes at least one constituent structure among public/private, structured append, read protection, and authentication structure, related to the constituent structure of a particular codework of the two-dimensional code that is specified in advance as being subject to evaluation.

Based on any one of the first invention to the sixth invention, in the two-dimensional code evaluation method according to a seventh invention, an output step of outputting the set of the plurality of two-dimensional codes is further included, and the receiving step includes receiving the configuration information and a set of two-dimensional codes generated based on the configuration information, and the output step includes dynamically displaying the set of the two-dimensional codes based on the received configuration information.

Based on any one of the first invention to the seventh invention, in the two-dimensional code evaluation method according to an eighth invention, at least one of a set of a plurality of two-dimensional codes, in which a same two-dimensional code is dynamically displayed based on the configuration information, a set of a plurality of two-dimensional codes, in which two or more different two-dimensional codes are dynamically displayed based on the configuration information comprising same display text information, and a set of a plurality of two-dimensional codes that are dynamically displayed based on the configuration information comprising different display text information is used.

The dynamic two-dimensional code evaluation system according to a ninth invention includes a receiving means for receiving configuration information for analyzing a set of a plurality of dynamically-displayed two-dimensional codes and evaluation information for evaluating a result of analysis, a photographing means for photographing a dynamically-displayed two-dimensional code, an analysis means for analyzing the photographed two-dimensional code based on the configuration information, and an evaluation means for evaluating the result of analysis in the analysis means based on the evaluation information.

The two-dimensional code evaluation program according to a tenth invention causes a computer to execute a receiving step of receiving configuration information for analyzing a set of a plurality of dynamically-displayed two-dimensional codes and evaluation information for evaluating a result of analysis, a photographing step of photographing a dynamically-displayed two-dimensional code, an analysis step of analyzing the photographed two-dimensional code based on the configuration information, and an evaluation step of evaluating the result of analysis in the analysis step based on the evaluation information.

The dynamic two-dimensional code management server according to an eleventh invention includes a storage unit to associate with one another and store configuration information comprising at least one of an inclination, a direction, front and back, which are inverted mirror images of a code symbol, a location of display, an order of display, an inverted image of light and dark of an image, colors of light and dark constituting a code, a type of a two-dimensional code, and format information of the two-dimensional code for dynamically displaying a same two-dimensional code or a plurality of different two-dimensional codes, and a generation unit to reference the configuration information stored in the storage unit, and generate a set of two-dimensional codes for dynamically displaying the plurality of two-dimensional codes in association with the referenced configuration information.

Advantageous Effects of Invention

According to the first to seventh inventions, in the receiving step, configuration information for analyzing a set of a plurality of dynamically-displayed two-dimensional codes and evaluation information for evaluating the result of analysis are received. Consequently, the code symbols of photographed two-dimensional codes can be analyzed per photographed frame. This makes it possible to read code symbols corresponding to a plurality of dynamically-displayed two-dimensional codes, which can be widely distributed in the form of electronic data suitable for mass production, and enables practical operation. In addition, with the passage of time, a plurality of code symbols can be dynamically displayed one by one, like a movie.

Furthermore, according to the first invention, in the photographing step, dynamically-displayed two-dimensional codes are photographed. Consequently, it is possible to read dynamic codes that change over time. This makes it possible to identify dynamic two-dimensional codes that are difficult to copy and are not easily tampered with or forged. Furthermore, general two-dimensional codes are used, it is highly practical.

Furthermore, the first invention includes an analysis step and an evaluation step. Consequently, a set of a plurality of dynamically-displayed two-dimensional codes can be evaluated by analyzing two-dimensional codes that combine code generation techniques for two-dimensional codes, and based on evaluation information. By this means, it is possible to make the configuration of a set of two-dimensional codes before photographing, and the evaluation of the set of two-dimensional codes after photographing, or two-dimensional codes, complex, and to prevent falsification or forgery of dynamically-displayed two-dimensional codes.

Furthermore, according to the second invention, the configuration information includes at least one of the inclination, the direction, the front and back, which are inverted mirror images of a code symbol, the location of display, the order of display, an inverted image of light and dark of an image, the colors of light and dark constituting a code, the type of a two-dimensional code, and format information of the two-dimensional code, related to display of the two-dimensional code. Consequently, by combining these, it is possible to display a plurality of dynamically-displayed two-dimensional codes in a variety of combinations of patterns. By this means, it is possible to make the configuration of a set of two-dimensional codes before photographing, and the evaluation of the set of two-dimensional codes after photographing, or two-dimensional codes, complex, and to prevent falsification or forgery of dynamically-displayed two-dimensional codes.

Furthermore, according to the third invention, the configuration information includes identification numbers related to the standard mask patterns of two-dimensional codes. Consequently, a set of a plurality of dynamically-displayed two-dimensional codes can be combined with code generation techniques for two-dimensional codes. By this means, it is possible to make the configuration of a set of two-dimensional codes before photographing, and the evaluation of the set of two-dimensional codes after photographing, or two-dimensional codes, complex, and to prevent falsification or forgery of dynamically-displayed two-dimensional codes even when a plurality of two-dimensional codes are duplicated.

Furthermore, according to the fourth invention, the configuration information includes the error correction words included in the two-dimensional codes. Consequently, a set of a plurality of dynamically-displayed two-dimensional codes can be combined with code generation techniques for two-dimensional codes. By this means, it is possible to make the configuration of a set of two-dimensional codes before photographing, and the evaluation of the set of two-dimensional codes after photographing, or two-dimensional codes, complex, and to prevent falsification or forgery of dynamically-displayed two-dimensional codes even when a plurality of two-dimensional codes are duplicated.

Furthermore, according to the fifth invention, the configuration information includes the codeword at a specific location among the data block constituent codewords. Consequently, a set of a plurality of dynamically-displayed two-dimensional codes can be combined with data code generation techniques. By this means, it is possible to make the configuration of a set of two-dimensional codes before photographing, and the evaluation of the set of two-dimensional codes after photographing, or two-dimensional codes, complex, and to prevent falsification or forgery of dynamically-displayed two-dimensional codes even when a plurality of two-dimensional codes are duplicated.

Furthermore, according to the sixth invention, the configuration information includes the constituent structure of a particular codeword. Consequently, a set of a plurality of dynamically-displayed two-dimensional codes can be combined with data code generation techniques. By this means, it is possible to make the configuration of a set of two-dimensional codes before photographing, and the evaluation of the set of two-dimensional codes after photographing, or two-dimensional codes, complex, and to prevent falsification or forgery of dynamically-displayed two-dimensional codes even when a plurality of two-dimensional codes are duplicated.

Furthermore, according to the seventh invention, in the receiving step, configuration information and a set of two-dimensional codes generated based on the configuration information are received. Consequently, it is possible to analyze the configuration information and dynamically output (display) a set of two-dimensional codes. By this means, it is possible to make the authentication of two-dimensional codes complex, and prevent falsification and forger of dynamically-displayed two-dimensional codes.

According to the ninth invention, the receiving means receives configuration information for analyzing a set of a plurality of dynamically-displayed two-dimensional codes and evaluation information for evaluating the result of analysis. Consequently, the code symbols of photographed two-dimensional codes can be analyzed per photographed frame. This makes it possible to read code symbols corresponding to a plurality of dynamically-displayed two-dimensional codes, which can be widely distributed in the form of electronic data suitable for mass production, and enables practical operation.

According to the tenth invention, in the receiving step, configuration information for analyzing a set of a plurality of dynamically-displayed two-dimensional codes and evaluation information for evaluating the result of analysis are received. Consequently, the code symbols of photographed two-dimensional codes can be analyzed per photographed frame. This makes it possible to read code symbols corresponding to a plurality of dynamically-displayed two-dimensional codes, which can be widely distributed in the form of electronic data suitable for mass production, and enables practical operation.

ADVANTAGEOUS EFFECTS OF INVENTION

FIG. 6 is a schematic diagram to show an example of a configuration information management table according to the present embodiment;

FIG. 7 is a schematic diagram to show an example of an evaluation information management table according to the present embodiment;

FIG. 9 is a schematic diagram to show an example of an overall structure of a dynamic two-dimensional code evaluation system according to the present embodiment.

DESCRIPTION OF EMBODIMENTS

Hereinafter, examples of the dynamic two-dimensional code evaluation system according to embodiments of the present invention will be described with reference to the accompanying drawings.

An example of the structure of a two-dimensional code symbol according to the present embodiment will be described with reference to FIG. 1.

<Example of Two-Dimensional Code According to the Present Embodiment>

First, QR code (registered trademark) will be described as an example of a two-dimensional code used in the present embodiment. Note that, unless otherwise specified, the following description will conform to Japanese industrial standard JIS X05102004, "Two-dimensional symbol—QR code (registered trademark)" (hereinafter may be referred to simply as "JIS standard"), or ISO/ISE standard 18004 2015, "Automatic identification and data capture techniques—QR Code bar code symbology specification", ISO/IEC standard 16022 2006, "Information technology—Automatic identification and data capture techniques-Data Matrix bar code symbology specification", or ISO/IEC standard 15438 2015, "Information technology—Automatic identification and data capture techniques-PDF417 bar code symbology specification". Encoders conforming to the above JIS standard or ISO/ISE standards will be referred to as "standard encoders", and decoders conforming to the JIS standard or ISO/ISE standards will be referred to as "standard decoders".

Furthermore, encoders that are capable of handling private data codewords (private information), which are made private (hidden), will be referred to as "extended encoders" (not shown), and decoders as "extended decoders". In addition, a dynamic two-dimensional code evaluation system may be constituted by extended encoders and extended decoders.

In a dynamic two-dimensional code evaluation system with extended encoders and extended decoders, the two-dimensional codes are presumed to be ones that enable recording of public information and private information (these two-dimensional codes may be sometimes referred to as "extended two-dimensional codes"). Public information refers to information that can be read by JIS-standard decoders (standard decoders). On the other hand, private information refers to information that cannot be read by standard decoders, and that can be extracted only by extended decoders.

Furthermore, in the following description, a "codeword" will be described as being 8-bit long, but a codeword may be 16-bit long as well, or may have other lengths such as 1 bit, depending on the system.

Figure 1:
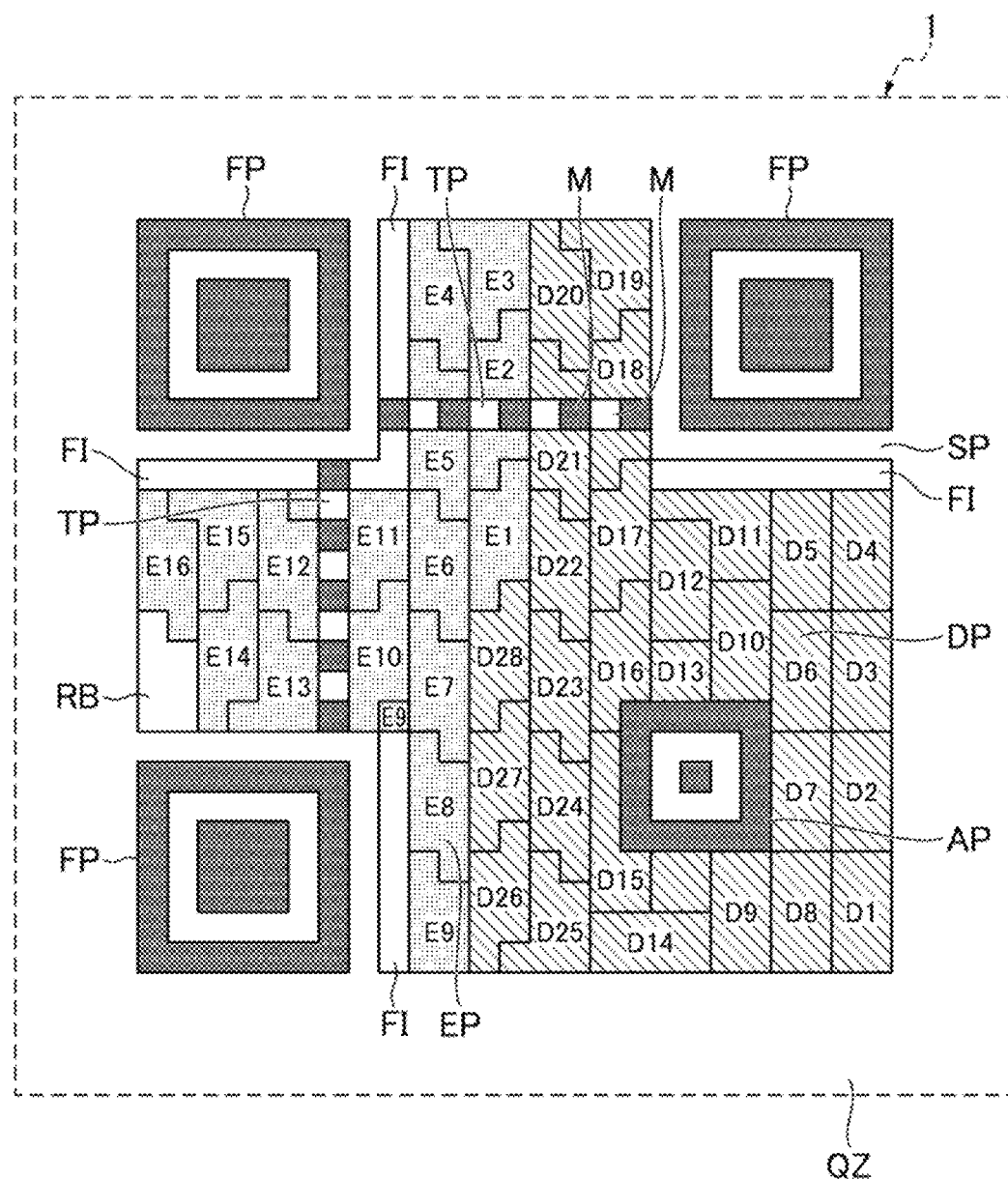
FIG. 1 is a schematic diagram to show an example of the structure of a two-dimensional code symbol.

FIG. 1 is an explanatory diagram of a two-dimensional code 40 (two-dimensional code symbol). Although the two-dimensional code 40 (hereinafter may be referred to simply as "QR code" (registered trademark)) is available in a variety of sizes from version 1 to version 40, each function will be described here with reference to version number "2" as an example.

The two-dimensional code 40 has function patterns and a coding region. The function patterns refer to patterns that are necessary for searching for the symbol location and identifying the characteristics of the two-dimensional code 40, which are necessary for assisting the decoding of the two-dimensional code 40 in modules. The coding region refers to a region where the necessary information is written.

The function patterns include location detection patterns FP, separation patterns SP, timing patterns TP, alignment patterns AP, and a quiet zone QZ.

The location detection patterns FP are patterns arranged in at least three corners of the two-dimensional code 40. By identifying the three location detection patterns FP upon reading, the direction and location of the code symbol of the two-dimensional code 40 can be identified correctly.

The separation patterns SP are light modules that are one-module wide and arranged around the location detection patterns FP. By this means, the location detection patterns FP can be identified from the code symbol of the two-dimensional code 40.

A module "M" is a unit cell that constitutes the code symbol of the two-dimensional code 40. As a general rule, one bit corresponds to one module. Note that, hereinafter, a set of a plurality of modules M to serve as unit cells constituting the two-dimensional code 40 will be referred to as a "module group".

The timing patterns TP are patterns, in which dark modules and light modules are arranged alternately, one by one, in a straight line. The timing patterns TP make it possible to identify the number of modules of the code symbol of the two-dimensional code 40, so that the version number of the two-dimensional code 40 can be identified.

The alignment patterns AP refer to patterns arranged in locations determined by the version number of the two-dimensional code 40. The alignment patterns AP serve to assist in finding the location of the two-dimensional code 40 when large modules are used.

The quiet zone QZ is a light module region, at least 4-modules wide and provided around the authentication information 0.

The coding region has a data codeword, an error correction codeword (hereinafter may be referred to simply as a "correction codeword"), and format information FI. Furthermore, in the above description, each function has been described with reference to version number "2" as an example, for example, version information (VI) is added to large version numbers. The format information FI carries information about the error correction level and the standard mask patterns (the mask patterns specified in the JIS standard). Note that, in the case of a two-dimensional code 40, generally, eight types (0 to 7) of mask display patterns are used as standard mask patterns, and any of these pattern numbers may be set. Depending on which pattern number is set, variations of black and white dots constituting the two-dimensional code 40 are displayed.

The data codeword and the error correction codeword are the data to represent the information and the error correction codeword for error correction for when the data cannot be read, and these are arranged. The format information carries information about the level of error correction to apply to the two-dimensional code 40 and the standard mask pattern to use, and is a coding pattern that is necessary for decoding the coding region.

First Embodiment

Figure 2:
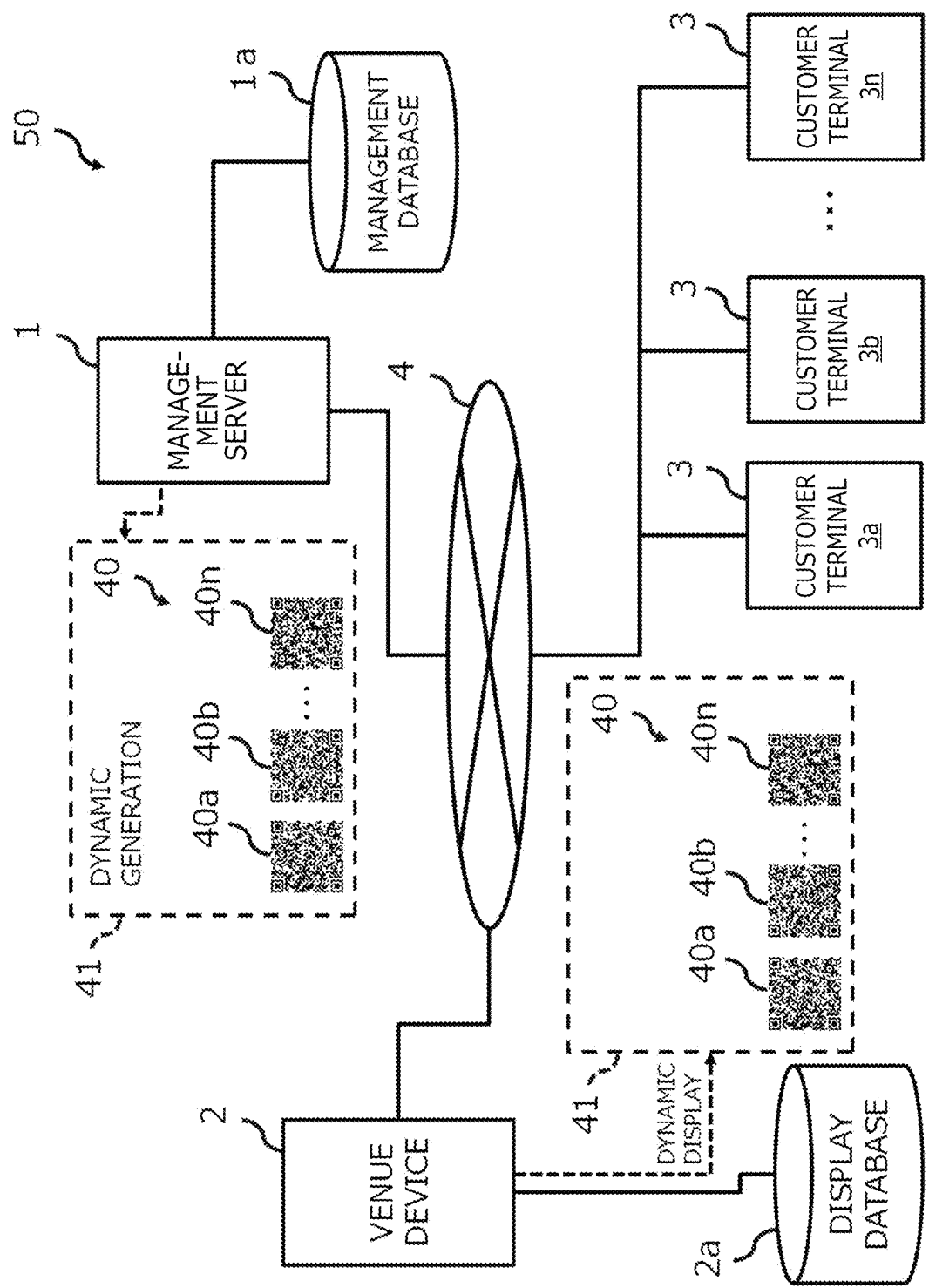
FIG. 2 is a schematic diagram to show an example of an overall structure of a dynamic two-dimensional code evaluation system according to the present embodiment.

An example of the structure of a dynamic two-dimensional code evaluation system 50 according to the first embodiment will be described with reference to FIG. 2 to FIG. 8. FIG. 2 is a block diagram to show an overall structure of the dynamic two-dimensional code evaluation system 50 according to the first embodiment.

As shown in FIG. 2, the dynamic two-dimensional code evaluation system 50 includes a management server 1. The management server 1 includes a management database 1a, and is comprised of a venue device 2 and a plurality of customer terminals 3. The dynamic two-dimensional code evaluation system 50 is connected with the venue device 2, a plurality of customer terminals 3 and so on, via a public communication network 4 (network). The customer terminal 3 photographs each of a plurality of two-dimensional codes 40 included in a two-dimensional code set 41, which is dynamically displayed by the venue device 2, evaluates the photographed two-dimensional codes 40, and receives a variety of information, services, and so forth.

The dynamic two-dimensional code evaluation system 50 displays a plurality of two-dimensional codes 40, included in a two-dimensional code set 41 generated by the management server 1, in, for example, facilities such as an event venue or a live-show venue, for a lottery for a person or a product, a game and so forth, on a screen, a display device or the like, provided in the venue device 2. The display on the screen, display device or the like may be shown, for example, at a speed of 300 milliseconds per frame, like a movie, or a plurality of code symbols may be displayed dynamically, one after another, like a movie, with the passage of time.

The venue device 2 is connected with the management server 1. The management server 1 permits access from the venue device 2, and transmits a plurality of two-dimensional codes 40, included in the two-dimensional code set 41 stored in the management database 1*a*, to venue device 2, with information and evaluation information, set up by the administrator or the like in advance. The customer terminals 3 photograph the two-dimensional codes 40, displayed one by one on the screen, display device, or the like, provided in the venue device 2.

Given the results of photographing in the customer terminals 3, it is possible to display different results, depending on the combination of configuration information set in advance for the two-dimensional code set 41, the display at a speed of 300 milliseconds per frame, like a movie, as described above, information about the owner of each customer terminal 3, the state of each customer terminal 3 (for example, photographing specifications, the timing for photographing, etc.) and so forth.

The management server 1 generates a two-dimensional code set 41, based on two-dimensional code sets 41 or two-dimensional codes 40 that are distributed in advance to related personnel, staff, customers and so on, including, for example, a variety information regarding an event or a live show to be held, the roles, characteristics and profiles of a variety of related personnel, staff and customers, and the functions and specifications of the customer terminals 2 they hold.

The management server 1 transmits the generated two-dimensional code set 41 or two-dimensional codes 40 to the venue device 2. The management server 1 references the information about the recipient such as related personnel, staff, customers and so on, stored in the management database 1*a*, and transmits the generated two-dimensional code set 41 or two-dimensional codes 40.

The two-dimensional code set 41 or the two-dimensional codes 40 may be generated electronically in the management server 1, or, for example, one two-dimensional code 40 to be evaluated may be generated (printed) in a state in which it is fixed and shown on printed matter, a package or the like. The two-dimensional code set 41 or two-dimensional codes 40 generated in the management server 1 are written as URL information to allow each distribution destination (for example, related personnel, staff, customer, etc.) to display the two-dimensional code set 41 or the two-dimensional codes 40 on the customer terminal 3, and sent out via a sending means such as e-mail or mail.

The venue device 2 may store the two-dimensional code set 41 received from the management server 1 in the display database 2*a* of the venue device 2, and, display a plurality of two-dimensional codes 40, from the two-dimensional code set 41 stored, based on the configuration information.

The venue device 2 includes a screen, a display device and the like (not shown) for displaying the two-dimensional codes 40 (two-dimensional code 40*a*, two-dimensional code 40*b*, two-dimensional code 40*n*, etc.) included in the two-dimensional code set 41.

Furthermore, for the venue device 2, which will be described later, for example, photographing devices such as cameras (not shown) that identify the two-dimensional code set 41 or two-dimensional codes 40, distributed in advance to the related personnel, staff, customers and the like, who enter and leave the venue, may be provided at the entrance/exit doors and gates. Consequently, the venue device 2 can, the two-dimensional code set 41 or the two-dimensional codes 40, distributed in advance to the related personnel, staff, customers and the like, can be photographed by the photographing devices provided at the doors or the gates. This makes it possible to prevent falsification and forgery of a variety of tickets.

The customer terminals 3 photograph a plurality of two-dimensional codes 40, held by each customer (for example, one who photographs or keeps record of the two-dimensional codes 40), and, for example, displayed one by one on a screen or a display device of an event venue, a live show venue or elsewhere, by using the photographing function or an application provided in the customer terminals 3. The two-dimensional codes 40 photographed by the customer terminals 3 may be stored one by one in the storage unit of the customer terminals 3, which will be described later, or may be stored in the storage unit (not shown) assigned on a cloud. Furthermore, each customer terminals 3 may store, for example, one two-dimensional code 40, photographed (selected) by the customer terminal 3, from the two-dimensional code set 41 that is displayed dynamically, at a specific or arbitrary timing. The customer terminals 3 allow efficient storage in the memories of the customer terminals 3 by storing the two-dimensional codes 40 at specific or arbitrary timings.

Furthermore, in the second embodiment described later, the customer terminals 3 receive the two-dimensional code set 41 from the management server 1, displays the received two-dimensional code set 41, and allow the photographing devices provided at the entrance/exit doors or gates of the venue device 2, or the terminals that the related personnel or the staff of an event or a live show photograph the two-dimensional code set 41.

Figure 3:
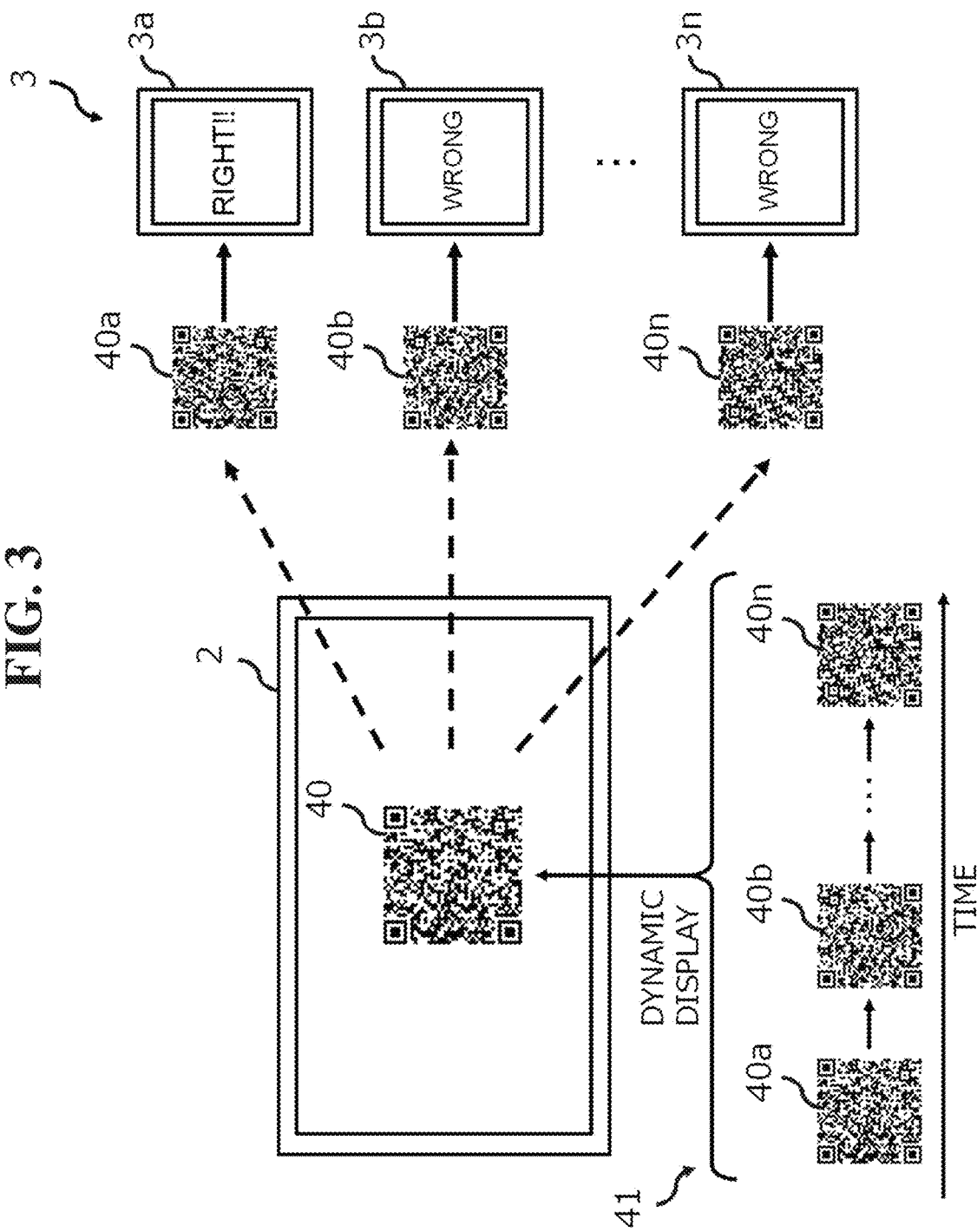
FIG. 3 is a schematic diagram to show an example of a dynamic display of a two-dimensional code according to the present embodiment.

The two-dimensional codes 40 included in the two-dimensional code set 41 displayed on the venue device 2 are, for example, as shown in FIG. 3, are photographed by the customer terminals 3 at a certain time, as a plurality of two-dimensional codes 40*a* to 40*n*, with the passage of time. In dynamic display, for example, a plurality of two-dimensional codes 40*a* to 40*n* are displayed as if they rotated. Each of the customer terminal 3*a* to the customer terminal 3*n* photographs the two-dimensional codes 40 dynamically displayed on the venue device 2.

The two-dimensional codes 40 to be displayed dynamically are a set of the two-dimensional codes 40*a* to 40*n* to be displayed dynamically on the venue device 2. The two-dimensional codes 40*a* to 40*n*, each photographed by each of the customer terminal 3*a* to the customer terminal 3*n*, are evaluated by the customer terminal 3*a* to the customer terminal 3*n*, and, based on each configuration information of the two-dimensional codes 40*a* to 40*n* as photographed, and the configuration information and evaluation information received in advance in each customer terminal 3*a* to customer terminal 3*n*, corresponding displays ("Right!!" and "Wrong") are shown on each of the customer terminal 3*a* to the customer terminal 3*n*.

<Customer Terminal 3>

Figure 4:
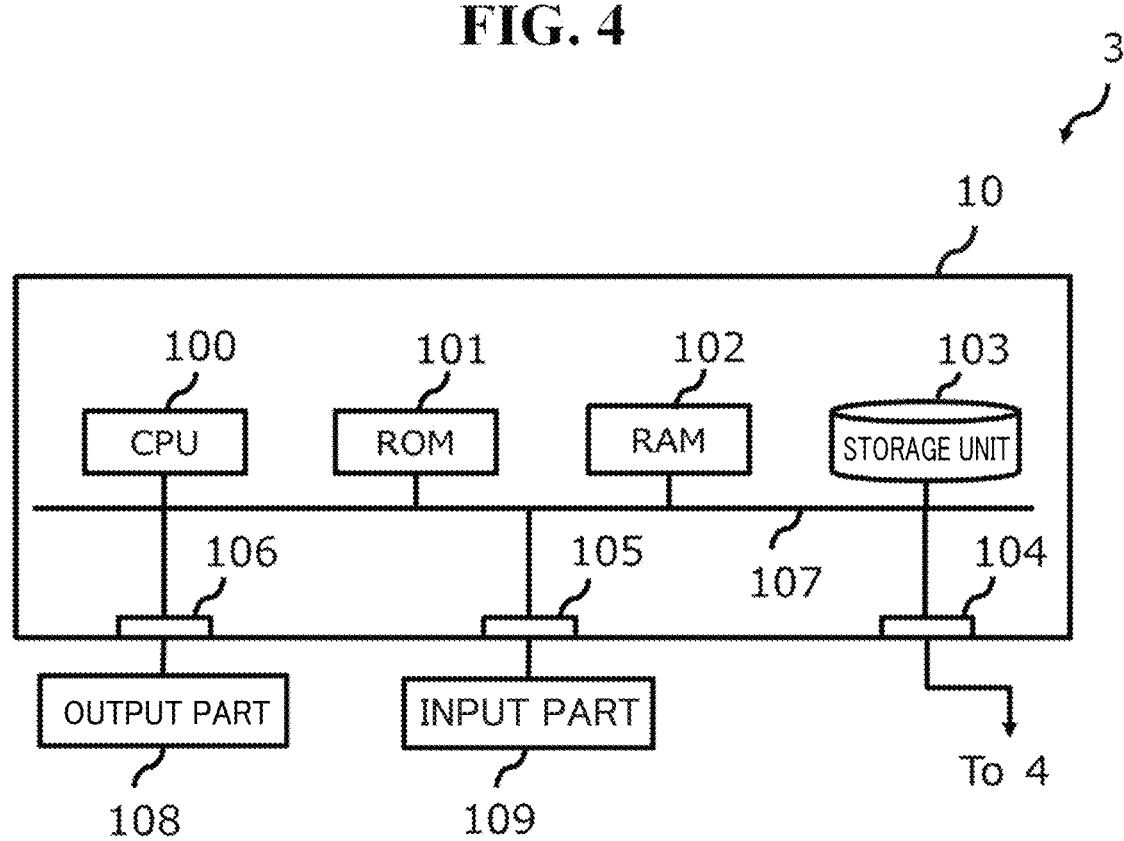
FIG. 4 is a schematic diagram to show an example of the structure of a customer terminal according to the present embodiment.

FIG. 4 is a schematic diagram to show an example of the configuration of the customer terminal 3 (which may be a customer terminal 3*a*, a customer terminal 3*b* and/or a customer terminal 3*c*). For the customer terminal 3, in addition to a personal computer (PC), an electronic device such as a smartphone or a tablet terminal may be used. The customer terminal 3 includes a housing 10, a CPU (Central Processing Unit) 100, a ROM (Read Only Memory) 101, a RAM (Random Access Memory) 102, a storage unit 103, and I/Fs 104 to 106. Each configuration 100 to 106 is connected by an internal bus 107.

The CPU 100 controls the entire customer terminal 3. The ROM 101 stores the operation code of the CPU 100. The RAM 102 is the work area that is used when the CPU 100 operates. The storage unit 103 stores a variety of information such as configuration information and evaluation information. For the storage unit 103, for example, in addition to an HDD (Hard Disk Drive), an SSD (Solid State Drive) or the like is used. Note that, for example, the customer terminal 3 may also have a GPU (Graphics Processing Unit) (not shown). Having a GPU enables faster arithmetic processing than usual.

The IF 104 is an interface for transmitting and receiving a variety of information to and from the management server 1, the venue device 2 and the like, via the public communication network 4.

The IF 105 is an interface for transmitting and receiving information with the input part 109. For the input part 109, for example, a keyboard, a touch panel or the like is used, and the customer, the administrator or the like who uses the dynamic two-dimensional code evaluation system 50 inputs or selects a variety of information or control commands for the customer terminal 3, via the input part 109.

The IF 106 is an interface for transmitting and receiving a variety of information with the output part 108. The output part 108 outputs a variety of information stored in the storage unit 103, the processing status of the customer terminal 3, and the like. A display device is used for the output part 108, and for example, a touch panel type may be used. In this case, the output part 108 may be configured to include the input part 109.

Figure 5:
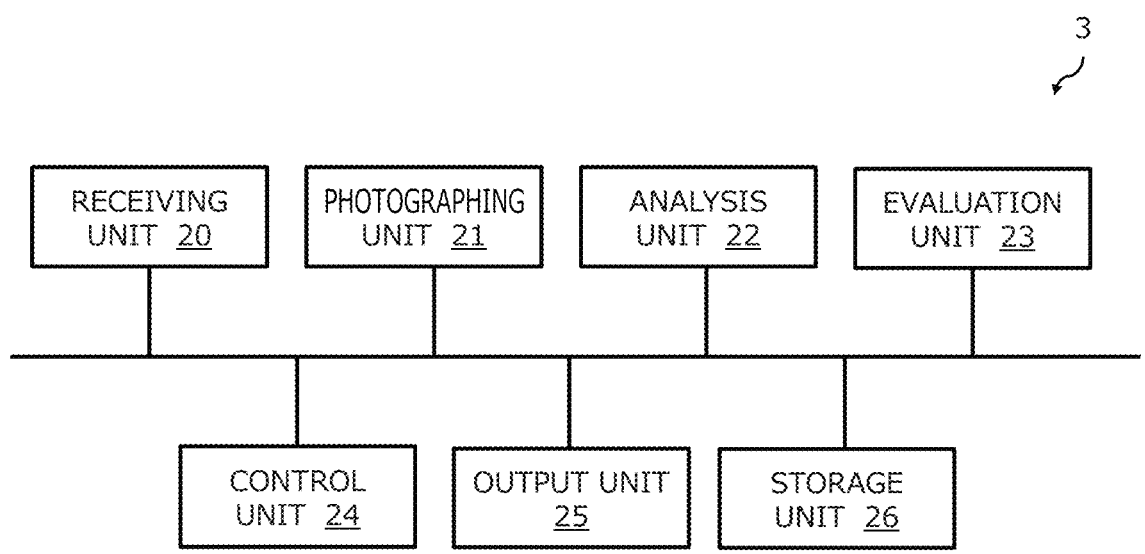
FIG. 5 is a schematic diagram to show examples of the functions of the customer terminal according to the present embodiment.

FIG. 5 is a schematic diagram to show examples of the functions of the customer terminal 3. The customer terminal 3 includes, for example, a receiving unit 20, a photographing unit 21, an analysis unit 22, an evaluation unit 23, a control unit 24, an output unit 25, and a storage unit 26. Note that each function shown in FIG. 5 is implemented by the CPU 100, which executes the programs stored in the storage unit 103 or the like, using the RAM 102 as a work area. Moreover, each function may be controlled by artificial intelligence, for example. Here, "artificial intelligence" may be based on any well-known artificial intelligence technology.

<Receiving Unit 20>

The receiving unit 20 receives configuration information for analyzing a plurality of two-dimensional codes 40 that are displayed dynamically by the venue device 2, and that constitute the two-dimensional code set 41, and evaluation information for evaluating the results of analysis in the customer terminal 3 or an external server (not shown). Furthermore, when the receiving unit 20 outputs (displays) a two-dimensional code set 41, the receiving unit 20 also receives a two-dimensional code set 41 that is generated based on the configuration information. The two-dimensional code set 41 received in the receiving unit 20 is displayed dynamically based on the configuration information.

The configuration information that the receiving unit 20 receives is, for example, a variety of configuration information that is stored in advance in the management database 1a of the management server 1, and that is associated with the configuration information IDs registered with the configuration information management table 1b. The evaluation information is, for example, a variety of evaluation information that is stored in advance in the evaluation information management table 1c, and that is associated with the evaluation information IDs registered with the evaluation information management table 1c.

<Configuration Information Management Table 1b>

FIG. 6 shows a variety of information stored in the configuration information management table 1b. In the setting management information table 1b, configuration information for identifying or authenticating photographed two-dimensional codes 40 is stored in association with two-dimensional codes 40. In the configuration information table, configuration information IDs are stored for each set of two-dimensional codes 40. A configuration information ID is set as configuration information that applies common to a set of two-dimensional codes 40. Therefore, for example, if there are a plurality of two-dimensional codes 40 to be displayed dynamically, common setting is applied to all of the two-dimensional codes 40 involved in this dynamic display.

<Configuration Information Table>

The configuration information table is generated in the management server 1, and the generated configuration information table is transmitted to the customer terminal 3 via the management server 1. The configuration information table that is transmitted to the customer terminal 3 is information to be analyzed in the customer terminal 3 on a local basis, and may be, for example, analyzed in the management server 1 as well. The configuration information management table 1b received in the receiving unit 20 of the customer terminal 3 stores, for example, a variety of information for analyzing and evaluating the two-dimensional codes 40. The items to be set in the configuration information management table 1b are set by, for example, the administrator of the management server 1. Each item to be set is given associations in, for example, a display information table, a standard mask pattern table, an error correction word information table, a constituent structure information table, and a display information table.

A variety of configuration information IDs set in the configuration information management table 1b are determined by, for example, the administrator or the organizer of the above-mentioned event or live show, and set as appropriate based on the scale of the event or live show, the number of participants, the place of venue, the time the event/live show is held, and, in addition, the conditions of the lottery. For the configurations, for example, a plurality of two-dimensional codes 40 to be evaluated and displayed dynamically are set based on a variety of information about events and live shows held in the past, such as the number of participants, questionnaire information, lottery results, history, and so forth.

The configuration information IDs are assigned to a plurality of two-dimensional codes 40 constituting the two-dimensional code set 41 to be evaluated, and is set to, for example, "0001" and "0002". For the configurations to be identified by each configuration information ID, for example, in the configuration information of the display information table, "A02 (direction)", "A04 (location of display)", "A05 (order of display)", "A07 (reversal of light and dark of the image)", "A07 (colors of light and dark constituting the code)", and "A08 (type of the two-dimensional code) are set. Furthermore, "B01 (pattern 0)" is set as the configuration information of the standard mask pattern table. "D01 (constituent structure public/private)", "D02 (structured append)", "D03 read protection" and "D04 authentication structure" are set in the constituent structure information table. "E01 (Right!!)" and "E02 (Wrong)" are set as display text information. Note that, although no error correction word information table is set, this cases indicates that this error correction word information has not been set, and which items are set is unspecified.

Furthermore, set information is set in the configuration information table. The set information is information to configure the operation related to dynamic display, and, for example, a variety of information such as the number of two-dimensional codes 40 to constitute the two-dimensional code set 41 that is displayed dynamically, whether or not there is a two-dimensional code 40 to serve as a starting point of evaluation (and, if there is, which two-dimensional code 40 it is), the time each two-dimensional code 40 is dynamically displayed (or the total time), and the coordinates (X-axis and Y-axis) of the location of display on the display device or the screen of the customer terminal 3. Note that the starting point may be dynamically set per customer terminal 3.

A variety of information set in the configuration information table may be, for example, any one of the configuration items, or may be set by combining all of the configuration items. As to what combination may be selected and set as appropriate based on information, including, for example, the organizer of an event or a live show, the nature and scale of the event, the characteristics of the target person, and customer benefits and so on.

In the display information table, for example, "A01: inclination (1 degree to 360 degrees)", "A02: direction (up/down/left/right)", "A03: front and back, which are inverted mirror images of the code symbol (front/back)", "A04: location of display (X-axis and Y-axis)", "A05: order of display (n-th)", "A06: inversion of light and dark of image", "A07: colors of light and dark constituting the code (#nnnnnn)", and "A08: type of the two-dimensional code" are set. Which items are set with which values and/or the like is unspecified.

In the standard mask pattern table, for example, eight types of "B01 (pattern 0)" to "B08 (pattern 7)" are set as information to indicate the standard mask pattern. Although, in general, the standard mask pattern is automatically determined based on the QR code (registered trademark) standard, which standard mask pattern is set is unspecified, and can be set in combination with other configuration information. When the standard mask patterns are combined with, for example, the display direction (up/down/left/right) of the two-dimensional codes 40, for example, up to 32 different configurations are possible. Consequently, any one, or a combination of two or more of them, may be made subject to evaluation for the two-dimensional codes 40 constituting the two-dimensional code set 41 (for example, "A02: direction (up)", "B01 (pattern 2)", etc.).

In the error correction word information table, for example, it is possible to include specific information in the region of the error correction word, before and after the processing of the error correction word. Although this information is a region that would otherwise be deleted after the error correction word is processed, by arranging the information to be evaluated in this region, it becomes possible to evaluate the two-dimensional codes 40 to be evaluated, amongst a plurality of two-dimensional codes 40 constituting the dynamically-displayed two-dimensional code set 41. In the error correction word information table, "C01 (before error correction processing)" and "C02 (after error correction process)" are set as information to indicate whether the processing of the error correction word is finished or not. Which is set in the region is unspecified.

The constituent structure information table can include, for example, at least one of public/private, structured append, read protection, and authentication structure, related to the constituent structure of a particular codeword of the two-dimensional code.

For example, when public/private of the constituent structure of a particular codeword of the two-dimensional code is made private, a part or all of the padding codes are replaced with the confidential data code of the two-dimensional code 40, and information about the arrangement is included after the termination identifier code. By this means, the confidential data code arranged after the terminal identifier code is not subject to reading by general-purpose reading devices. Furthermore, the structured append is provided based on, for example, the specifications of the JIS standard described above, shows the state of connection of a plurality of two-dimensional codes 40, and includes this information as a structured append. Furthermore, read protection means, for example, given a two-dimensional code 40, finding the protection coding code block by performing a masking process based on the standard mask pattern, and, in addition by performing protection coding process based on a protection coding pattern that is defined apart from that, so that other standard reading means that do not know this rule or the protection coding pattern cannot figure out the constitution of the two-dimensional code and therefore cannot read the code, and including information related to this process as read information. The authentication structure includes, for example, related code information for making it possible to identify that a plurality of related two-dimensional codes 40 are associated with each other, in the confidential data code of the two-dimensional code 40.

<Evaluation Information Management Table 1c>

FIG. 7 shows a variety of information stored in the evaluation information management table 1c. In the evaluation management information table 1c, evaluation information for identifying or authenticating the two-dimensional codes 40 that are photographed, amongst the two-dimensional codes 40 constituting the dynamically-displayed two-dimensional code set 41 is stored. In the evaluation information management table 1c, the evaluation information IDs of two-dimensional codes 40 to be evaluated are stored per two-dimensional code set 41. One or a plurality of evaluation information IDs are set as evaluation information that applies common to a plurality of two-dimensional codes 40 constituting a two-dimensional code set 41. Consequently, for example, if a plurality of two-dimensional codes 40 constitute a two-dimensional code set 41 that is displayed dynamically, common evaluation is applied to all of the two-dimensional codes 40 displayed dynamically. What evaluation is rendered is unspecified, and, for example, as described earlier, it is possible to combine with, for example, information about an event or a live show that is held, information about the equipment at the venue, information about the customer terminals 3 (customers), and so forth.

A variety of evaluation information IDs set forth in the evaluation information management table 1c are determined by, for example, the administrator or the organizer of the above-mentioned event or live show, and set as appropriate based on the scale of the event or live show, the number of participants, the place of venue, the time the event/live show is held, and, in addition, the conditions of the lottery. For the configurations, for example, a plurality of two-dimensional codes 40 to be evaluated and displayed dynamically are set based on a variety of information about events and live shows held in the past, such as the number of participants, questionnaire information, lottery results, history, and so forth. What mode of display is used is unspecified.

The evaluation information IDs are assigned to a set of a plurality of two-dimensional codes 40 to be evaluated, and is set to, for example, "0001", "0002". For the configurations to be identified by each evaluation information ID, for example, "right" for "A02 (direction)", "coordinates XXX, YYY" for "A04 (location of display)", "3rd" for "A05 (order of display)", "#0000000" for "A07 (colors of light and dark constituting the code)", and "pattern 0" for "A08 (type of the two-dimensional code)" and "B01 (standard mask pattern)" are set as evaluation information, corresponding to each item set forth in the display information table described above. What mode display is used is unspecified.

The customer terminals 3 store the display text as information to display on the customer terminals 3, depending on the result of evaluation. The display text stores "E01 (Right!!)" to display the evaluation shows a match with the evaluation condition, and stores "E02 (Wrong)" to display when the evaluation fails to show a match with the evaluation condition. The display text stored here may be, besides text information, still images such as illustrations and photographs, movies, and voice data, for example. What type of content is displayed is unspecified.

<Photographing Unit 21>

The photographing unit 21 photographs the two-dimensional codes 40 that are displayed dynamically by the venue device 2. The photographing unit 21 activates, for example, the photographing function (camera function) or photographing application provided in the customer terminal 3, and photographs the two-dimensional codes 40. By this photographing, a movie may be taken, as well as a still image. The photographing unit 21 photographs the two-dimensional code set 41 or the two-dimensional codes 40, and stores the two-dimensional code set 41 or two-dimensional codes 40 in the storage unit 103 of the customer terminal 3 or in the storage unit 26 of the customer terminal 3, which will be described later.

When photographing the two-dimensional code set 41 or two-dimensional codes 40, the photographing unit 21 acquires a variety of information about photographing conditions such as the photographing date and time, the photographing location and so forth together, and stores this information in the storage unit 103, the storage unit 26 or elsewhere, in association with the two-dimensional code set 41 or each of the two-dimensional codes 40.

<Analysis Unit 22>

The analysis unit 22 analyzes the photographed two-dimensional code set 41 or two-dimensional codes 40 based on the configuration information. Apart from the customer terminal 3, if for example, the analysis by the analysis unit 22 involves processes that cannot be handled in the customer terminal 3 due to security reasons, the analysis may take place in the management server 1, and the customer terminal 3 may receive the result of the analysis (not shown).

The analysis unit 22 performs the analysis based on a variety of configuration information related to the two-dimensional code set 41 or two-dimensional codes 40 received in the receiving unit 20. Based on which configuration information IDs the photographed two-dimensional code set 41 or two-dimensional codes 40 are analyzed in the analysis unit 22 may be arranged in advance in the management server 1, the venue device 2, and the customer terminal 3. The customer selects the configuration information IDs to be set for the two-dimensional code set 41 or two-dimensional codes 40 to be photographed, from a plurality of configuration information IDs displayed, via the customer terminal 3. The analysis unit 22 analyzes each configuration of the two-dimensional codes 40 based on the configurations identified from the selected configuration information IDs.

The analysis unit 22 analyzes the configuration items included in the configuration information received in the receiving unit 20, based on the structure in which the photographed two-dimensional code set 41 or two-dimensional codes 40 are formed, the state of dynamic display, or the change or order of the two-dimensional code set 41 to be displayed dynamically, and so forth.

For example, the analysis unit 22 compares each of the two-dimensional code set 41 or two-dimensional codes 40 photographed, and the configuration items and configuration information received in advance, with the configuration information included in the configuration items. The configuration items include, for example, "A01: inclination (1 degree to 360 degrees)", "A02: direction (up/down/left/right)", "A03: front and back, which are inverted mirror images of the code symbol (front/back)", "A04: location of display (X-axis and Y-axis)", "A05: order of display (n-th)", "A07: colors of light and dark constituting the code (#nnnnnn)", "B01 (pattern 0)" to "B08 (pattern 71)", "C01 (before error correction)", and "C02 (after error correction)". Whether each configuration item constituting the photographed two-dimensional codes 40 is different from the configuration items set in advance as configuration information is determined through comparison with each configuration information recorded in the configuration information management table 1b. Based on the configuration information of the two-dimensional code set 41, the analysis unit 22 compares whether the two-dimensional code set 41 or two-dimensional codes 40 match in specific configuration items, and analyzes the photographed two-dimensional code set 41 or two-dimensional codes 40 from those results. These configuration items enable setting and analysis of a plurality of configuration information.

If there is no difference between each configuration item constituting the photographed two-dimensional code set 41 or two-dimensional codes 40 and the configuration items set in advance as configuration information and set information according to the results of analysis, the analysis unit 22 identifies the correct two-dimensional code set 41 or two-dimensional codes 40 to be evaluated. By this means, the two-dimensional code set 41 or two-dimensional codes 40 that are likely to have been tampered with or forged can be identified, and the two-dimensional code set 41 or two-dimensional codes 40 to be evaluated can be excluded.

On the other hand, if there is a difference between each configuration item constituting the photographed two-dimensional code set 41 or two-dimensional codes 40 and the configuration item set in advance as configuration information, the analysis unit 22 determines that the two-dimensional code set 41 or two-dimensional codes 40 are not subject to evaluation, finishes the analysis process, and then photographs the two-dimensional code set 41 or two-dimensional code 40 to be displayed dynamically next. Note that, in addition to the two-dimensional code set 41 or two-dimensional codes 40 photographed by the photographing unit 21, the analysis unit 22 may also read the two-dimensional code set 41 or two-dimensional codes 40 stored in the storage unit 103 of the customer terminal 3, and analyze the two-dimensional code set 41 or two-dimensional codes 40 read. The two-dimensional code set 41 or two-dimensional codes 40 may be analyzed, for example, in an external server (not shown) or the like, apart from the customer terminal 3.

<Evaluation Unit 23>

When the two-dimensional code set 41 or two-dimensional codes 40 are identified as being subject to evaluation according to the result of analysis in the analysis unit 22, the evaluation unit 23 further makes evaluation based on the evaluation information received in the receiving unit 20 in advance. To be more specific, the evaluation unit 23 evaluates the condition of each configuration information of the configuration information analyzed in the analysis unit 22, based on each corresponding information stored in the evaluation information management table 1c.

The evaluation unit 23 references the evaluation information stored in the evaluation information management table 1c, and, for example, judges whether evaluation information such as "right" for "A02 (direction)", "coordinates XXX, YYY" for "A04 (location of display)", "3rd" for "A05 (order of display)", "#0000000" for "A07 (colors of light and dark constituting the code)", and "pattern 0" for "B01 (standard mask pattern)" are set, and, if part or all of these evaluation conditions are met, "E01 (Right!!)" is displayed in the output unit 25 of the customer terminal 3. What is displayed is unspecified, and other words or the like may be displayed as well.

If none of the evaluation conditions included in the evaluation information matches, the evaluation unit 23 displays "E02 (Wrong)" in the output unit 25 of the customer terminal 3, and then photographs the two-dimensional code 40 to be dynamically displayed next. The evaluation unit 23 reads the two-dimensional code set 41 or two-dimensional codes 40 analyzed in the analysis unit 22, into the storage unit 103 of the customer terminal 3, evaluates the two-dimensional code set 41 or two-dimensional codes 40 read, and displays the result of evaluation on the output unit 25 of the customer terminal 3. Note that, although an example has been described with above embodiment where a two-dimensional code set 41 or two-dimensional codes 40 are photographed once for analysis and evaluation, it is equally possible, for example, to photograph the two-dimensional code set 41 or two-dimensional codes 40 a plurality of times. For example, a two-dimensional code set 41 can be displayed dynamically like a movie. In this case, the analysis in the analysis unit 22 may be performed as appropriate based on the photographing in the photographing unit 21, and the two-dimensional code set 41 or a plurality of two-dimensional codes 40 that are photographed may be evaluated in the evaluation unit 23.

<Control Unit 24>

The control unit 24 controls the receiving unit 20, the photographing unit 21, the analysis unit 22, the evaluation unit 23, the output unit 25 and the storage unit 26 of the customer terminal 3.

<Output Unit 25>

The output unit 25 outputs the result of analysis by the analysis unit 22 and the result of evaluation by the evaluation unit 23. The output unit 25 may transmit the analysis result and the evaluation result to the output part 108 via the I/F 106, and, furthermore, for example, transmit the analysis result or the evaluation result to the management server 1, the venue device 2 and elsewhere, via the I/F 104. The output unit 25 may output a variety of conditions such as configuration information.

<Storage Unit 26>

The storage unit 26 stores a variety of information, including the configuration information and evaluation information received in the receiving unit 20, in the storage unit 103. The storage unit 26 takes out a variety of information such as each information table stored in the storage unit 103, as needed. A variety of information such as past configuration information and evaluation information, acquired in advance, are stored in the information tables.

<Management Server 1>

In the management server 1, a database related to a variety of information is stored as the management database 1a. In this management database 1a, for example, a variety of information sent via the public communication network 4 are stored. For the variety of information, the configuration information management table 1b and the evaluation information management table 1c, which will be described later, are stored, or the same information as in the storage unit 103 may be stored, and a variety of information may be sent and received with the venue device 2 and the customer terminal 3 via the public communication network 4.

Furthermore, if the customer terminal 3 has a problem, or if the processing capacity and security of the customer terminal 3 are questionable, or depending on the amount of information of the two-dimensional code set 41 or two-dimensional codes 40 to process, the management server 1 may process part or the whole of the analysis process in an analysis unit 22 (not shown).

<Venue Device 2>

The venue device 2 has the same configuration as the customer terminal 3 described above (not shown), and an electronic device such as a personal computer (PC) is used. The output part 108 of the venue device 2 is provided with, for example, a large display device or a projector, and displays or projects a two-dimensional code set 41 or two-dimensional codes 40 at an event venue, a live show venue or elsewhere, as described above. There may be a plurality of large display devices and screens at an event venue, live show venue, or elsewhere. The two-dimensional code set 41 or two-dimensional codes 40 are controlled by the control unit 24 of the venue device 2 so that the same two-dimensional code 40 is displayed or projected one by one on each display device or screen. Note that display devices and screens are intended for the venue device 2, but, for example, the television screen or game screen at home may be used as well.

In the venue device 2, a database related to a variety of information related to the two-dimensional code set 41 or two-dimensional codes 40 to be dynamically displayed is stored as a display database 2a. In this display database 2a, for example, a variety of information sent via the public communication network 4 is stored. For the variety of information, configuration information related to the display or projection of two-dimensional code sets 41 or two-dimensional codes 40 in the venue device 2 is stored. The venue device 2 displays or projects two-dimensional code sets 41 or two-dimensional codes 40 based on the configuration information stored in the display database 2a. In the display database 2a, a variety of information are stored, and may be transmitted and received with the management server 1 and the customer terminal 3, via the public communication network 4, and, furthermore, may be transmitted and delivered as a movie from the management server 1.

<Public Communication Network 4>

The public communication network 4 is an internet network or the like, to which the management server 1, the venue device 2, the customer terminals 3, and the like are connected via a communication circuit. The public communication network 4 may be comprised of a so-called optical fiber communication network. Furthermore, the public communication network 4 is not limited to a wired communication network, and may be implemented by a wireless communication network, and, furthermore, radio waves for TV broadcasting such as general terrestrial broadcasting and satellite broadcasting may be used as well.

<Operation of Dynamic Two-Dimensional Code Evaluation System 50>

Figure 8:
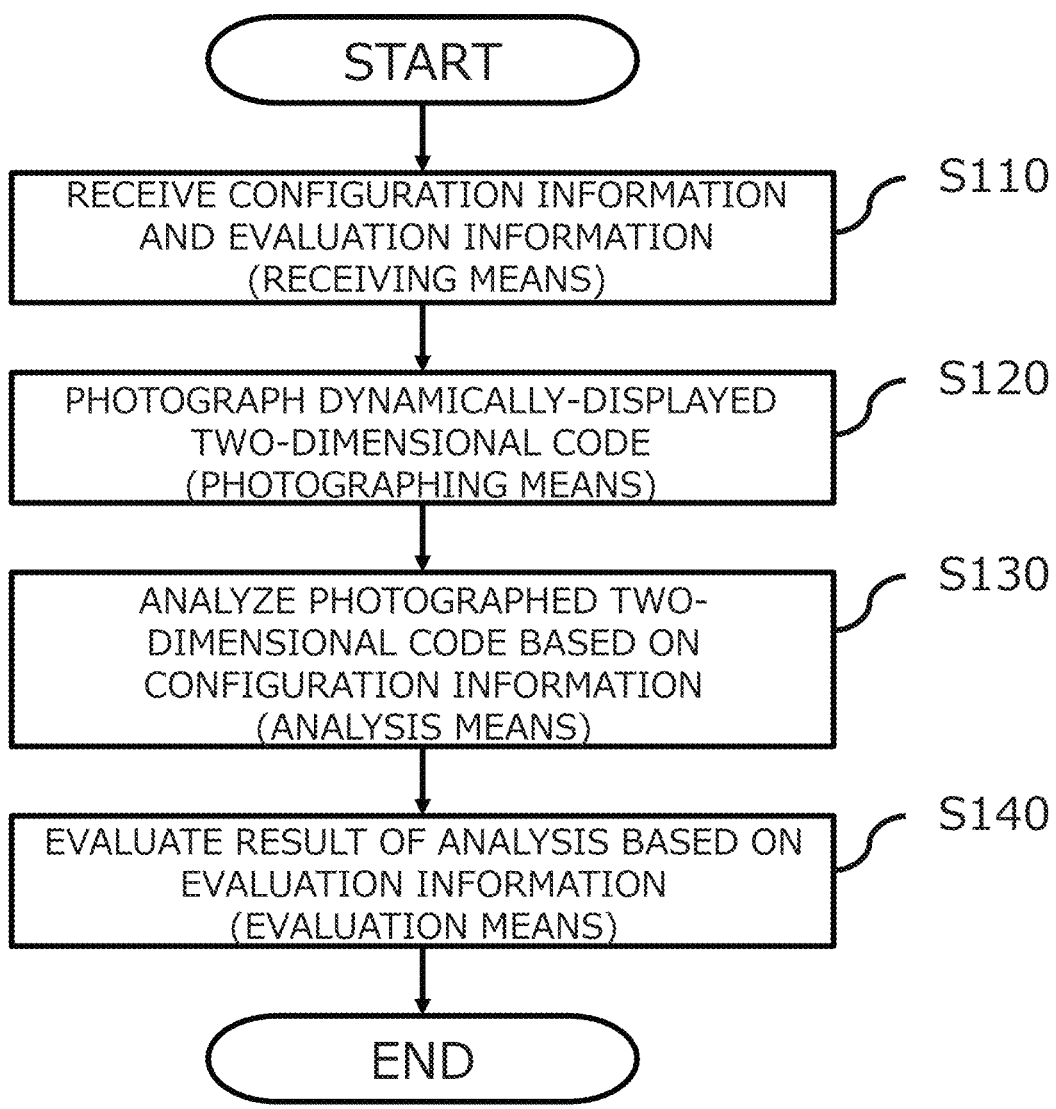
FIG. 8 is a flowchart to show an example of the operation of a dynamic two-dimensional code evaluation system according to the present embodiment.

Next, an example of the operation of the dynamic two-dimensional code evaluation system 50 according to the present embodiment will be described. FIG. 8 is a flowchart to show an example of the operation of the dynamic two-dimensional code evaluation system 50 according to the present embodiment.

<Receiving Means S110>

First, the receiving unit 20 receives, for example, configuration information for analyzing the two-dimensional code set 41 or two-dimensional codes 40, dynamically displayed on the venue device 2, and evaluation information for evaluating the result of analysis, from the management server 1 (receiving means S110). The receiving unit 20 receives, for example, a variety of information in the configuration information management table 1b stored in the management database 1a of the management server 1, or configuration information associated with the configuration information IDs related to the two-dimensional code set 41 or two-dimensional codes 40 dynamically displayed by the venue device 2, set information, and evaluation information of the evaluation information management table 1c, and stores each received information in the storage unit 103.

<Photographing Means S120>

The photographing unit 21 photographs, for example, the two-dimensional code set 41 or two-dimensional codes 40, dynamically displayed by the venue device 2 (photographing means S120). The photographing unit 21 photographs the dynamically-displayed two-dimensional code set 41 or two-dimensional codes 40, one by one, and, furthermore, records, as a movie, a series of two-dimensional code set 41 or two-dimensional codes 40 (two-dimensional code 40a to two-dimensional code 40n) that are dynamically-displayed. The photographing unit 21 may acquire information such as the date and time of photographing, the location, who photographed, and so forth, and store the information in the storage unit 103 or the like via the storage unit 26.

<Analysis Means S130>

The analysis unit 22 analyzes the photographed two-dimensional code set 41 or two-dimensional codes based on the configuration information (analysis means S130). The analysis unit 22 reads the configuration information, received in advance in the receiving unit 20 and stored in the storage unit 103, and analyzes each information constituting the photographed two-dimensional code set 41 or two-dimensional codes 40. The analysis of the two-dimensional code 40 in the analysis unit 22 may be performed in the customer terminal 3, or may be performed in, for example, the management server 1. In that case, the customer terminal 3 transmits the photographed two-dimensional codes 40 to the management server 1.

The analysis unit 22 compares each configuration item constituting the photographed two-dimensional code set 41 or two-dimensional codes 40, with the configuration information received in advance. Furthermore, the analysis unit 22 determines, through comparison, whether a particular two-dimensional code set 41 or two-dimensional codes 40 are present, based on the set information, and, if there is no difference with the configuration items set in advance, from the results of analysis, the correct two-dimensional code set 41 or two-dimensional codes 40 to be evaluated.

<Evaluation Means S140>

The evaluation unit 23 evaluates the results of analysis in the analysis unit 22, based on the evaluation information (evaluation means S140). The evaluation unit 23 reads the evaluation information, received in advance in the receiving unit 20 and stored in the storage unit 103, and evaluates the configuration conditions of each configuration item of the two-dimensional code set 41 or two-dimensional codes 40, analyzed in the analysis unit 22 identified as the correct two-dimensional code set 41 or two-dimensional codes to be evaluated. If the configuration conditions and the evaluation conditions all match, the evaluation unit 23 lets the output unit 25 of the customer terminal 3 to output, for example, "Right!!", and, if no match is found, output "Wrong".

This finishes the operation of the dynamic two-dimensional code evaluation system 50 according to the first embodiment is completed.

Second Embodiment

Next, the dynamic two-dimensional code evaluation system 50 according to a second embodiment will be described. FIG. 9 is a schematic diagram to show an example of the dynamic two-dimensional code evaluation system 50 according to the second embodiment.

The difference between the above-described embodiment and the second embodiment is that the customer terminals 3 (customer terminal 3a, customer terminal 3b to customer terminal 3n, etc.). output (display) a two-dimensional code set 41 or two-dimensional codes 40 (two-dimensional code 40a, two-dimensional code 40b, two-dimensional code 40n, etc.), and photographs the two-dimensional code set 41 or two-dimensional codes 40 (two-dimensional code 40a, two-dimensional code 40b, two-dimensional code 40n, etc.), displayed per customer terminal 3, with the photographing unit 21 provided in the venue device 2. Description of the same configuration as described above will be omitted.

According to the second embodiment, a two-dimensional code set 41 or two-dimensional codes 40, received in a customer terminal 3 in advance and stored in the storage unit 26 of the customer terminal 3, are read out, and the code set 41 or two-dimensional codes 40 read are displayed on the display device or the like of the customer terminal 3, via the output unit 25 of the customer terminal 3.

Each customer terminal 3 includes an output unit 25 that outputs a set of a plurality of two-dimensional codes, and the receiving unit 20 receives the configuration information and the two-dimensional code set 41 generated based on the configuration information. After that, the output unit 25 dynamically displays the two-dimensional code set 41 based on the received configuration information.

In the venue device 2, for example, a photographing unit 21 is provided at the entrance/exit door or gate of the venue. The photographing unit 21 is similar to the photographing unit 21 of the customer terminal 3 described above, and photographs the two-dimensional code set 41 or the two-dimensional codes 40, and analyzes the photographed two-dimensional code set 41 or two-dimensional codes 40 of the customer terminal 3, in the analysis unit 22, based on the configuration information and evaluation information received from the management server 1, evaluates the photographed two-dimensional code set 41 or two-dimensional codes 40, in the evaluation unit 23, based on the evaluation information, and performs authentication to, for example, check whether the customer is a legitimate customer, for example.

This finishes the operation of the dynamic two-dimensional code evaluation system 50 according to the second embodiment.

According to the present embodiment, the configuration information and evaluation information received in the receiving unit 20 may be information that is generated in advance based on, for example, customer information, such as the profile and characteristics of each customer, the contents of an event or a live show to be held, the scale of the venue, the equipment, and so forth. Therefore, it is possible to photograph a two-dimensional code set 41 or two-dimensional codes 40 that are displayed dynamically depending on customers and the date and time (contents) the event is held. This makes it possible to analyze and evaluate a two-dimensional code set 41 or two-dimensional codes 40 photographed by the customers at the venue on a real-time basis, and prevent outputs based on a two-dimensional code set 41 or two-dimensional codes 40 tampered with or forged.

Furthermore, according to the present embodiment, the configuration information includes information about at least one of the inclination, the direction, the front and back, which are inverted mirror images of the code symbol, the location of display, the order of display, and the colors of light and dark constituting the code, related to the display of a two-dimensional code set 41 or two-dimensional codes 40. Furthermore, the evaluation information includes information about at least one of the inclination, the direction, the front and back, which are inverted mirror images of the code symbol, the location of display, the order of display, and the colors of light and dark constituting the code, related to display that is specified in advance to be evaluated, and the information is received. Consequently, it is possible to make the analysis and evaluation of a two-dimensional code set 41 or two-dimensional codes 40 photographed by the customer terminals 3 complex. By this means, it is possible to prevent falsification or forgery of a two-dimensional code set 41 or two-dimensional codes 40. Furthermore, since the operation and display can be set up in detail depending on analysis and evaluation, optimal displays (message, for example) and special benefits (coupons) can be given to each customer in advance.

In particular, according to the present embodiment, for example, a two-dimensional code set 41 or a plurality of two-dimensional codes 40 that are displayed dynamically in a variety of ways are photographed, so that the two-dimensional code set 41 or two-dimensional codes 40 are displayed dynamically rotating clockwise about the center of the two-dimensional codes 40, displayed dynamically by switching up, down, left, and right, displayed switching between front and back, and so forth. Therefore, the timing of photographing can be increased compared to the case of photographing one two-dimensional code 40 that is displayed in a fixed manner, as in conventional cases. This makes it possible to associate between a variety of evaluations and outputs, which may lead to increased photographing opportunities and stronger motive for customer participation in events.

In particular, according to the present embodiment, the receiving unit 20 receives changed configuration information and evaluation information (combination of at least one of the inclination, the direction, the front and back, which are inverted mirror images of the code symbol, the location of display, the order of display, and the colors of light and dark constituting the code, related to display of two-dimensional codes 40), on a real time basis. Therefore, the received configuration information and evaluation information can be reflected. By this means, it becomes possible to analyze and evaluate a two-dimensional code set 41 or two-dimensional codes 40 that are dynamically displayed right in front, while at the venue of an event, a live show and the like, so that it is possible to check outputs that are linked with the opening and progress of the event, live show, and the like.

Furthermore, according to the present embodiment, the configuration information is the identification numbers for the standard mask patterns of two-dimensional codes 40, the evaluation information is the identification numbers of standard mask patterns specified in advance as being subject to evaluation, and these pieces of information are received. Therefore, it is possible to further combine with information of at least one of the inclination, the direction, the front and back, which are inverted mirror images of the code symbol, the location of display, the order of display, and the colors of light and dark constituting the code, related to display of two-dimensional codes 40, as described earlier. By this means, it is possible to make the analysis and evaluation of a two-dimensional code set 41 or two-dimensional codes 40 photographed by customer terminals 3 complex, and prevent falsification or forgery of the two-dimensional code set 41 or two-dimensional codes 40 that are displayed dynamically.

Furthermore, according to the present embodiment, the configuration information can be the error correction word included in two-dimensional codes 40, and the evaluation information can be the error correction word specified in advance as being subject to evaluation. Consequently, it is possible to make the analysis and evaluation of two-dimensional codes 40 photographed by customer terminals 3 complex. By this means, it is possible to prevent falsification or forgery of two-dimensional codes 40 that are displayed dynamically.

Note that, according to the present embodiment, it is possible to provide a dynamic two-dimensional code evaluation program that operates on customer terminals 3, and cause a computer to execute means S110 to S140 as steps (for example, receiving step, photographing step, analysis step, evaluation step, etc.). In this case, too, it is possible to analyze two-dimensional codes 40 that are dynamically displayed in the same manner as described above, based on configuration information, and evaluate the result of analysis based on evaluation information. This makes it possible to evaluate two-dimensional codes 40 that are displayed dynamically on display devices, screens or the like, per customer terminal 3, at the same event venue, live show venue, or elsewhere. This makes it possible to read code symbols corresponding to a plurality of two-dimensional code sets 41 or two-dimensional codes that are displayed dynamically. The organizer of an event or a live show can mass-produce the two-dimensional codes 40 to display dynamically, distribute these widely as electronic data, and enable practical operation.

Furthermore, according to the present embodiment, a dynamic two-dimensional code evaluation method can be provided by a receiving means for implementing a receiving means S110 for receiving configuration information for analyzing a set of a plurality of dynamically-displayed two-dimensional codes and evaluation information for evaluating the result of analysis, a photographing means for implementing a photographing means S120 for photographing a dynamically-displayed two-dimensional code, an analysis means for implementing an analysis means S130 for analyzing the photographed two-dimensional code based on the configuration information, and an evaluation means for implementing an evaluation means S140 for evaluating the result of analysis in the analysis means based on the evaluation information.

Furthermore, according to the present embodiment, the evaluation unit 23 may associate the customer terminals 3 (target persons) set in the evaluation information table, with additional information, based on, for example, evaluation results. By this means, it is possible to provide still different additional values even among customer terminals 3 that match the evaluation conditions.

Furthermore, according to the present embodiment, as described above, analysis and evaluation are performed based on configuration information and evaluation information, so that, for example, types of codes pertaining to different standards can be mixed.

Furthermore, according to the present embodiment, a plurality of two-dimensional codes 40 are circulated and displayed dynamically, and, in addition, a two-dimensional code set 41 may be dynamically displayed once (one loop) as in, for example, streaming distribution. Furthermore, it is possible to designate the starting time of a dynamic display, and execute the dynamic display at the designated time. These dynamic displays may be arranged by the organizer of an event, a live show or the like, and may be set in association with the related contents to be displayed (for example, information, advertisements, etc.) or other movies (for example, promotion videos, preview videos, etc.).

Furthermore, according to the present embodiment, the venue device 2 may be, for example, a store terminal installed in a store or elsewhere (not shown). The store terminal dynamically displays a predetermined two-dimensional code set 41 or two-dimensional codes 40, and the customers who visit the store photograph these with the photographing unit 21 of their customer terminals 3. In this case, the customer terminals 3 may perform the above-described analysis and evaluation based on, for example, the configuration information and evaluation information transmitted in advance from the store server based on the photographed two-dimensional code set 41 or two-dimensional codes 41, and display the result of evaluation. The evaluation result displayed on the customer terminals 3 may be, for example, coupon information that is valid at the store.

Furthermore, according to the present embodiment, if a store terminal installed in a store or elsewhere photographs a two-dimensional code set 41 or two-dimensional codes 40, the customer terminal 3 of a customer visiting the store dynamically displays a predetermined two-dimensional code set 41 or two-dimensional codes 40. The store terminal may photograph the two-dimensional code set 41 or two-dimensional codes 40 dynamically displayed on the customer terminal 3, perform the above-mentioned analysis and evaluation based on the configuration information and evaluation information stored in advance, and display the result of evaluation. The evaluation result displayed on the store terminal serves as, for example, customer authentication information, whereby it is possible to check whether or not the customer is a legitimate registered customer.

Furthermore, according to the present embodiment, a plurality of different customer terminals 3 (customer terminal 3a, customer terminal 3b to customer terminal 3n, etc.) may exchange points, send gifts, and so forth, via a two-dimensional code set 41 or two-dimensional codes 40. In this case, for example, the management server 1 transmits the two-dimensional code set 41 or two-dimensional codes 40 to the customer terminal 3a, and the customer terminal 3a displays the received two-dimensional code set 41 or two-dimensional codes 40. The other customer terminal 3b to the customer terminal 3n photograph the two-dimensional code set 41 or two-dimensional codes 40, dynamically displayed on the customer terminal 3a, perform analysis and evaluation based on the configuration information and evaluation information, and display the results of evaluation on the customer terminal 3b to the customer terminal 3n. Each customer terminal 3 can exchange points, send gifts and so on, via the two-dimensional code set 41 and two-dimensional codes 40 that are dynamically displayed, so that it is possible to check who is making a request and who the request is directed to, prevent falsification and forgery of a variety of tickets, and so forth.

Furthermore, according to the present embodiment, a two-dimensional code set 41 generated by the management server 1 is used as, for example, a one-time password generator that is displayed in the form of a valid number in synchronization with the management server or the like (not shown). With a general one-time password generator, valid numerical values, changing over time, are generated on the display of the one-time password generator, and used as passwords for authentication. If the generation side and the authentication side do not share the same secret, so-called "answer synchronization" cannot be established.

Although a one-time password displays a valid numerical value generated, for example, if the valid numerical value that is displayed is recorded and this recorded numerical value is changed to a different input value, this might enable log-in spoofing. According to the present embodiment, when a two-dimensional code set 41 or two-dimensional codes 40 are displayed dynamically, the display pattern cannot be recorded, and, furthermore, changes dynamically, so that, for example, it is not possible to find out which two-dimensional codes 40 are correct in the dynamically-displayed two-dimensional code set 41. Furthermore, a dynamically-displayed two-dimensional code set or two-dimensional codes 40 can be appropriately photographed on the reading end, and the photographed result or the captured image may be analyzed and evaluated via, for example, the management server 1. With such a configuration, for example, processes and load related to analysis and evaluation can be imparted, so that it is possible to ensure security, and improve the efficiency of processes.

Furthermore, according to the present embodiment, the customer terminal 3 may perform evaluation by combining a dynamically-displayed two-dimensional code set 41 and other two-dimensional codes 40 (not shown) (for example, printed on paper media). For example, the customer may photograph a two-dimensional code 40 that is distributed in advance, via the customer terminal 3, and, by combining the evaluation result of that photographed two-dimensional code 40 with a two-dimensional code set 41 that is photographed later, evaluate the two-dimensional codes 40 to be evaluated from among the dynamically-displayed two-dimensional code sets 41. Furthermore, any two-dimensional codes 40 may be evaluated from a two-dimensional code set 41 that is displayed dynamically, and, furthermore, two-dimensional codes 40 that are specified by the evaluated two-dimensional codes 40 may be evaluated. With such a configuration, it is possible to operate authentication using two-dimensional codes 40 that are difficult to tamper with or forge.

Furthermore, according to the present embodiment, two-dimensional codes 40 are applicable to code symbols of a variety of two-dimensional codes, such as DataMatrix (registered trademark) and PDF417, in addition to QR code (registered trademark).

Furthermore, standards for two-dimensional codes are defined, for example, by JIS standards in Japan, and by ISO standards on an international level. Known as two-dimensional codes are, for example, JIS X 0510: 2004, "Two-dimensional code symbol—QR code (registered trademark)", ISO/IEC 18004: 2000, "Information Technology—

Automatic identification and data capture techniques-Bar code symbology-QR Code", and so on.

Furthermore, known as DataMatrix codes are, for example, JIS X 0512: 2015, "Information Technology—Automatic Recognition and Data Acquisition Technology—Barcode Symbol System Specifications—Data Matrix", ISO/IEC 16022: 2006, "Information technology—Automatic identification and data capture techniques—Data Matrix bar code symbology specification", and so on.

Furthermore, known as PDF417 codes are, for example, JIS X 0508: 2010, "Barcode Symbol System Specifications—PDF417", ISO/IEC 15438: 2006, "Information technology—Automatic identification and data capture techniques—PDF417 bar code symbology specification", and so on.

Although embodiments of the present invention have been described, these embodiments are presented as examples and are not intended to limit the scope of the invention. These novel embodiments can be implemented in a variety of other embodiments, and a variety of omissions, replacements, and changes can be made without departing from the gist of the invention. These embodiments and modifications thereof are included in the scope and gist of the invention, and are also included in the scope of the invention described in the claims and the equivalent scope thereof.

REFERENCE SIGNS LIST

1: management server
1a: management database
1b: configuration information management table
1c: evaluation information management table
10: housing
100: CPU
101: ROM
102: RAM
103: storing unit
104-106: I/F
107: internal bus
108: output part
109: input part
2: venue device
2a: display database
20: receiving unit
21: photographing unit
22: analysis unit
23: evaluation unit
24: control unit
25: output unit
26: storage unit
3: customer terminal
3a: customer terminal
3b: customer terminal
3c: customer terminal
3n: customer terminal
4: public communication network (network)
40: two-dimensional code
40a: two-dimensional code
40b: two-dimensional code
40n: two-dimensional code
41: two-dimensional code set
50: dynamic two-dimensional code evaluation system
S110: receiving means
S120: photographing means
S130: analysis means
S140: evaluation means

The invention claimed is:

1. A dynamic two-dimensional code evaluation method, the method comprising:
a receiving step of receiving (i) configuration information for analyzing a plurality of two-dimensional codes included in a two-dimensional code set that is dynamically displayed, the configuration information including an inclination and a display order of the two-dimensional codes, and (ii) evaluation information for evaluating a result of an analysis;
a photographing step of photographing a dynamically-displayed two-dimensional code;
an analysis step of analyzing the photographed two-dimensional code based on the configuration information; and
an evaluation step of evaluating the result of the analysis in the analysis step based on the evaluation information,
wherein the configuration information further includes setting information for each of the two-dimensional codes relating to dynamic display of the two-dimensional code set to which the two-dimensional codes belong, the setting information including a combination of (i) the display order, (ii) a number of the two-dimensional codes to be evaluated, (iii) presence or absence of a two-dimensional code to be used as a starting point for evaluation, and (iv) an identifier of the two-dimensional code to be used as the starting point for evaluation, when present.

2. The dynamic two-dimensional code evaluation method according to claim 1,
wherein the configuration information further includes at least one of a direction, front and back, which are inverted mirror images of a code symbol, a location of display, an inverted image of light and dark of an image, colors of light and dark constituting a code, a type of a two-dimensional code, and format information of the two-dimensional code, the format information being related to the dynamic display of the two-dimensional code set, the format information including the number of the two-dimensional codes to be evaluated, the presence or absence of the two-dimensional code to be used as the starting point for evaluation, and the identifier of the two-dimensional code to be used as the starting point for evaluation, when present, and all items of the format information being set for each of the two-dimensional codes of the two-dimensional code set to be dynamically displayed, and
wherein the evaluation information comprises at least one of an inclination, a direction, front and back, which are inverted mirror images of a code symbol, a location of display, an order of display, an inverted image of light and dark of an image, colors of light and dark constituting a code, a type of a two-dimensional code, and format information of the two-dimensional code, related to dynamic display of a two-dimensional code that is specified in advance as being subject to evaluation.

3. The dynamic two-dimensional code evaluation method according to claim 1,
wherein the configuration information comprises an identification number related to a standard mask pattern of the two-dimensional code, and
wherein the evaluation information comprises an identification number of a standard mask pattern that is specified in advance as being subject to evaluation.

4. The dynamic two-dimensional code evaluation method according to claim 1, wherein the configuration information comprises an error correction word included in the two-dimensional code, and wherein the evaluation information comprises an error correction word that is specified in advance as being subject to evaluation.

5. The dynamic two-dimensional code evaluation method according to claim 1, wherein the configuration information comprises a codeword at a specific location, among data block constituent codewords consisting of a data codeword and a correction data codeword constituting the two-dimensional code, and wherein the evaluation information comprises a codeword at a specific location, among data block constituent codewords consisting of a data codeword and a correction data codeword constituting the two-dimensional code that is specified in advance as being subject to evaluation.

6. The dynamic two-dimensional code evaluation method according to claim 1, wherein the configuration information comprises at least one constituent structure among public/private, structured append, read protection, and authentication structure, related to the constituent structure of a particular codeword of the two-dimensional code, and wherein the evaluation information comprises at least one constituent structure among public/private, structured append, read protection, and authentication structure, related to the constituent structure of a particular codework of the two-dimensional code that is specified in advance as being subject to evaluation.

7. The dynamic two-dimensional code evaluation method according to claim 1, further comprising an output step of outputting the set of the plurality of two-dimensional codes, wherein the receiving step comprises receiving the configuration information and a set of two-dimensional codes generated based on the configuration information, and wherein the output step comprises dynamically displaying the set of the two-dimensional codes based on the received configuration information.

8. The dynamic two-dimensional code evaluation method according to claim 1, wherein the two-dimensional code set comprises at least one of a set of a plurality of two-dimensional codes, in which a same two-dimensional code is dynamically displayed based on the configuration information, a set of a plurality of two-dimensional codes, in which two or more different two-dimensional codes are dynamically displayed based on the configuration information comprising same display text information, and a set of a plurality of two-dimensional codes that are dynamically displayed based on the configuration information comprising different display text information.

9. A dynamic two-dimensional code evaluation system, comprising:

a display; and a user terminal comprising a hardware processor which, under control of a stored program, executes processes comprising:

a receiving process of receiving (i) configuration information for analyzing a plurality of two-dimensional codes included in a two-dimensional code set that is dynamically displayed, the configuration information including a slope and a display order of the two-dimensional codes, and (ii) evaluation information for evaluating a result of an analysis;

a photographing process of photographing a dynamically-displayed two-dimensional code dynamically displayed on the display;

an analysis process of analyzing the photographed two-dimensional code based on the configuration information; and an evaluation process of evaluating the result of the analysis in the analysis process based on the evaluation information, wherein the configuration information further includes setting information for each of the two-dimensional codes relating to dynamic display of the two-dimensional code set to which the two-dimensional codes belong, the setting information including a combination of (i) the display order, (ii) a number of the two-dimensional codes to be evaluated, (iii) presence or absence of a two-dimensional code to be used as a starting point for evaluation, and (iv) an identifier of the two-dimensional code to be used as the starting point for evaluation, when present.

10. A non-transitory computer readable medium storing a dynamic two-dimensional code evaluation program for causing a computer to execute operations comprising:

a receiving step of receiving (i) configuration information for analyzing a plurality of two-dimensional codes included in a two-dimensional code set that is dynamically displayed, the configuration information including a slope and a display order of the two-dimensional codes, and (ii) evaluation information for evaluating a result of an analysis;

a photographing step of photographing a dynamically-displayed two-dimensional code;

an analysis step of analyzing the photographed two-dimensional code based on the configuration information; and an evaluation step of evaluating the result of the analysis in the analysis step based on the evaluation information, wherein the configuration information further includes setting information for each of the two-dimensional codes relating to dynamic display of the two-dimensional code set to which the two-dimensional codes belong, the setting information including a combination of (i) the display order, (ii) a number of the two-dimensional codes to be evaluated, (iii) presence or absence of a two-dimensional code to be used as a starting point for evaluation, and (iv) an identifier of the two-dimensional code to be used as the starting point for evaluation, when present.

* * * * *